July 12, 1955             A. W. NOON             2,712,860
CIRCULAR SELECTOR CONTROLS FOR AUTOMATIC ELEVATORS
Filed Oct. 15, 1951             6 Sheets-Sheet 1
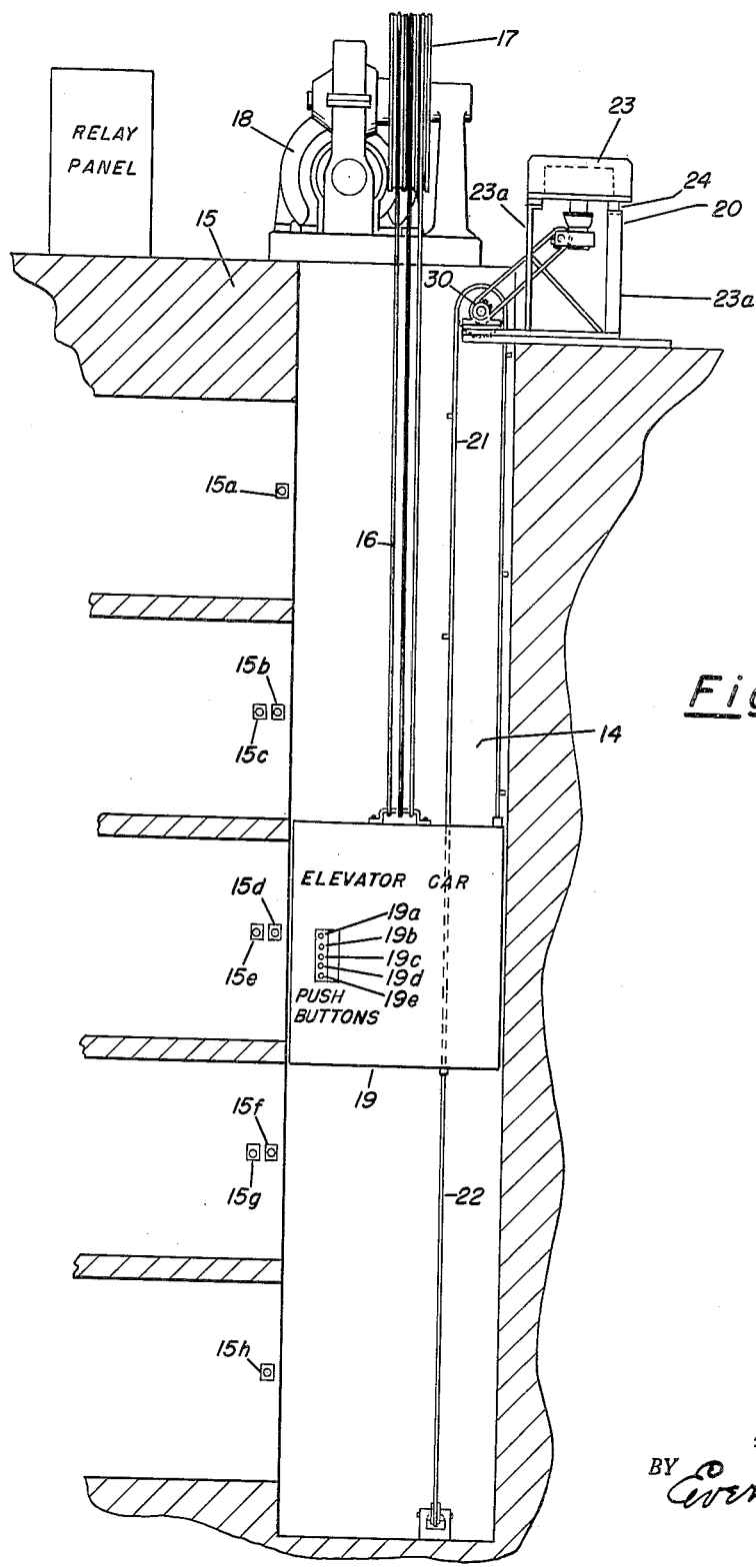
Fig. 1
INVENTOR.
ALONZO W. NOON
BY 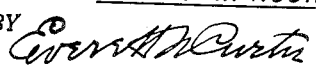
ATTORNEY July 12, 1955 A. W. NOON 2,712,860
CIRCULAR SELECTOR CONTROLS FOR AUTOMATIC ELEVATORS
Filed Oct. 15, 1951 6 Sheets-Sheet 2

INVENTOR.
ALONZO W. NOON
BY
*Everett A. Curtin*
ATTORNEY

July 12, 1955 A. W. NOON 2,712,860
CIRCULAR SELECTOR CONTROLS FOR AUTOMATIC ELEVATORS
Filed Oct. 15, 1951 6 Sheets-Sheet 3
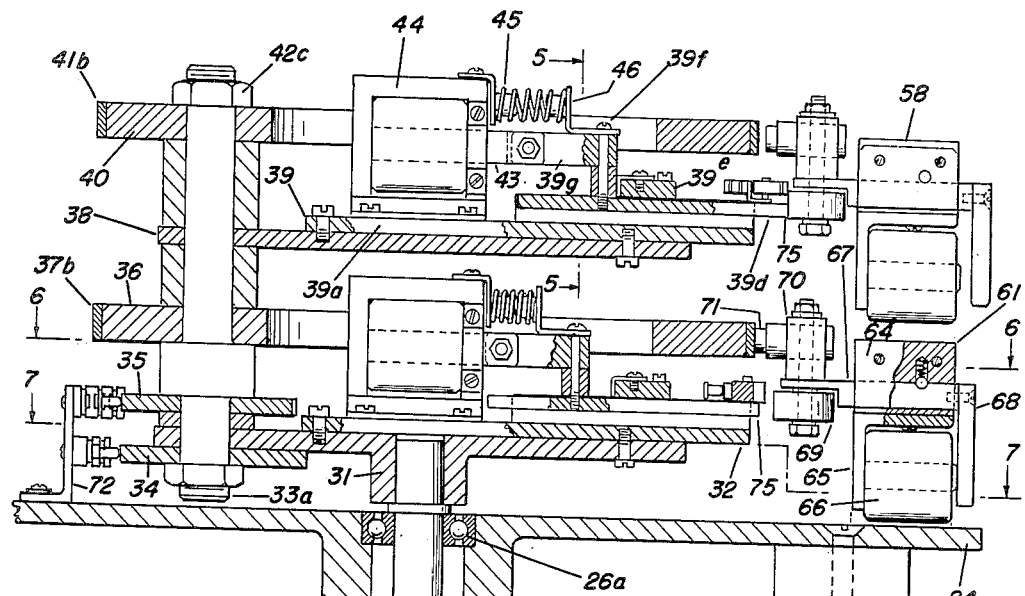
Fig. 4
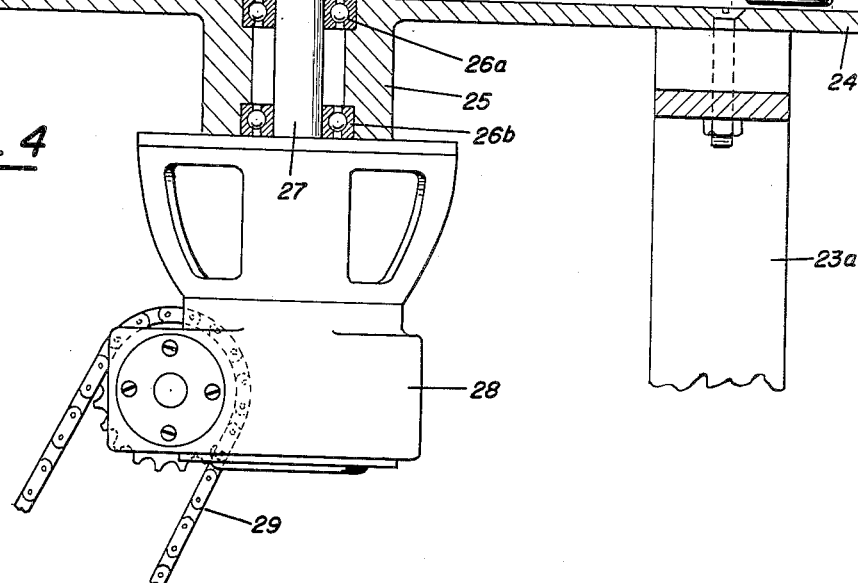
Fig. 5
INVENTOR.
ALONZO W. NOON
BY
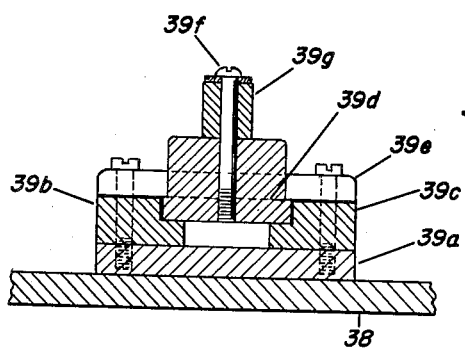
ATTORNEY July 12, 1955   A. W. NOON   2,712,860
CIRCULAR SELECTOR CONTROLS FOR AUTOMATIC ELEVATORS
Filed Oct. 15, 1951   6 Sheets-Sheet 4

INVENTOR.
ALONZO W. NOON
BY
ATTORNEY

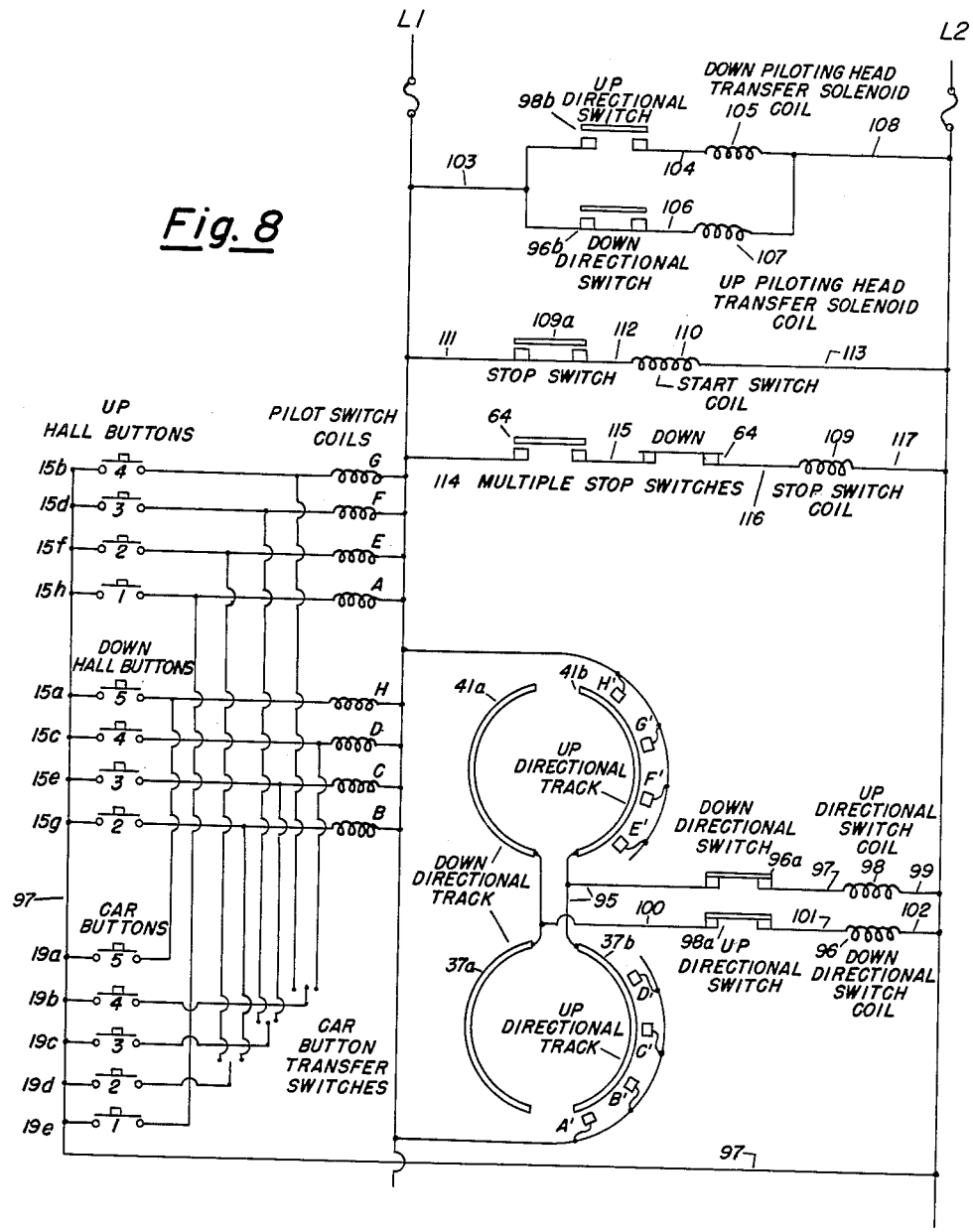

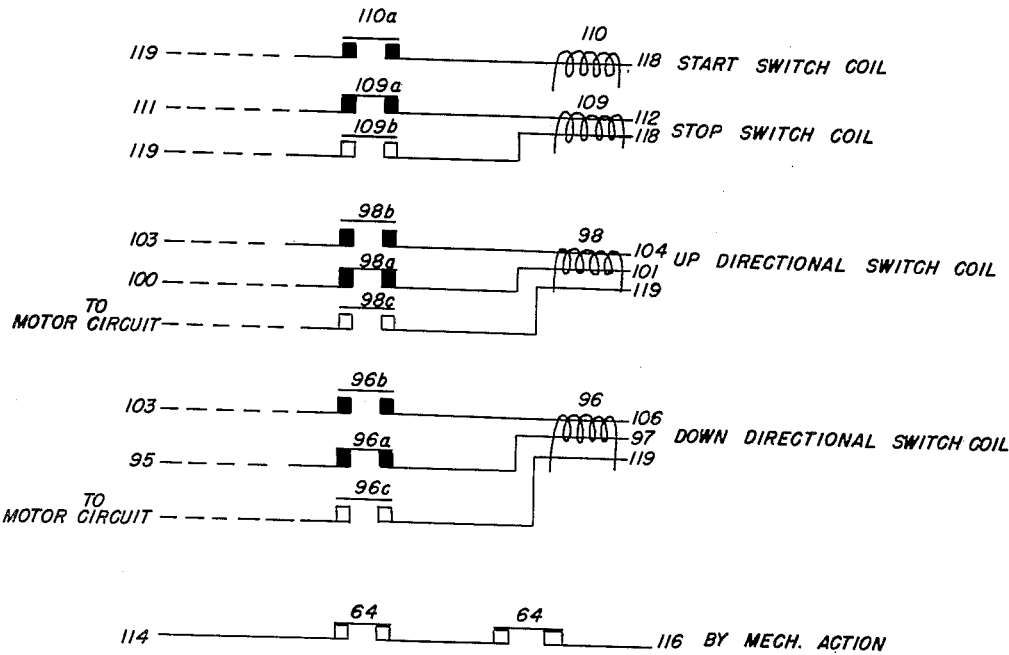
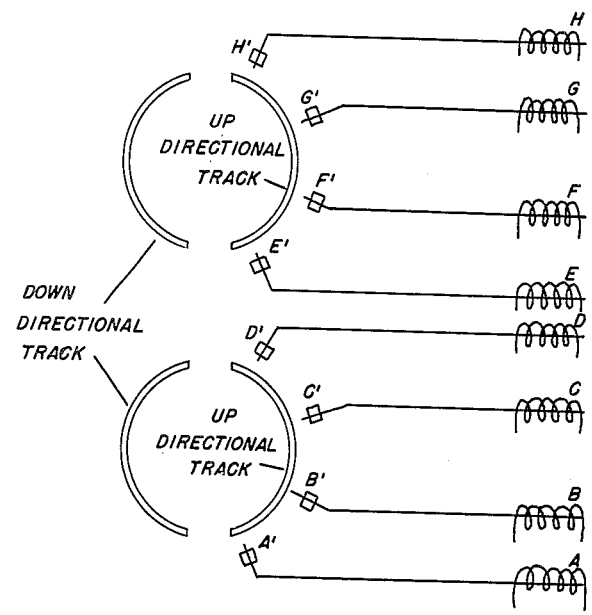
Fig. 10
INVENTOR.
ALONZO W. NOON

United States Patent Office 2,712,860
Patented July 12, 1955

2,712,860

CIRCULAR SELECTOR CONTROLS FOR AUTOMATIC ELEVATORS

Alonzo W. Noon, San Diego, Calif., assignor to William P. Elser, San Diego, Calif.

Application October 15, 1951, Serial No. 251,303

9 Claims. (Cl. 187—29)

My invention relates to circular selector controls for automatic elevators, and its objects are to provide an elevator system wherein the selector control is predominantly mechanical and electrical connections are largely dispensed with or rendered less complex; to provide a more efficient control for causing the elevator car automatically to stop to discharge passengers at floors selected by the operator; to cause the elevator car, while travelling up or down, automatically to stop at any floor to pick up passengers desiring to travel in the direction in which the car is proceeding and later to return in the opposite direction to pick up passengers wishing to proceed in said reversed direction; to cause the car to stop to pick up passengers desiring to go in an opposite direction to that in which the car has been proceeding and then to proceed in such reversed direction if there are no passengers wishing to go in the original direction, to render the parts of the control and connections thereof accessible for inspection, adjustment, replacement, restoration and repair, and generally to provide an automatic elevator control which is simple and economical of construction, efficient in action, novel in design, and of prolonged life and durability. These and other objects will appear from the drawing and as hereinafter more particularly described and claimed.

This invention is an improvement upon the invention disclosed in my application for Letters Patent of the United States, Serial No. 143,440, filed February 10, 1950, resulting in U. S. Patent No. 2,600,676, issued June 17, 1952 for Electro-Mechanical Automatic Elevator Controls.

Attention is hereby directed to the drawing, illustrating a preferred form of my invention, in which similar numerals of designation refer to similar parts throughout the several views, and in which—

Figure 1 is a simplified schematic representation of an elevator system, showing the application of my invention thereto;

Fig. 4 is a vertical section on line 4—4, of Fig. 2, looking in the direction of the arrows, and showing the casing removed;

Fig. 5 is an enlarged vertical section on line 5—5 of Fig. 4, looking in the direction indicated by the arrows;

Fig. 8 is a schematic wiring diagram showing the car buttons, hall buttons, and selector circuit;

Fig. 9 is a schematic wiring diagram showing in conjunction with Fig. 8, the elevator control circuit; and Fig. 10 is a spindle diagram of the coils and control members shown schematically in Fig. 8.

Figure 2:
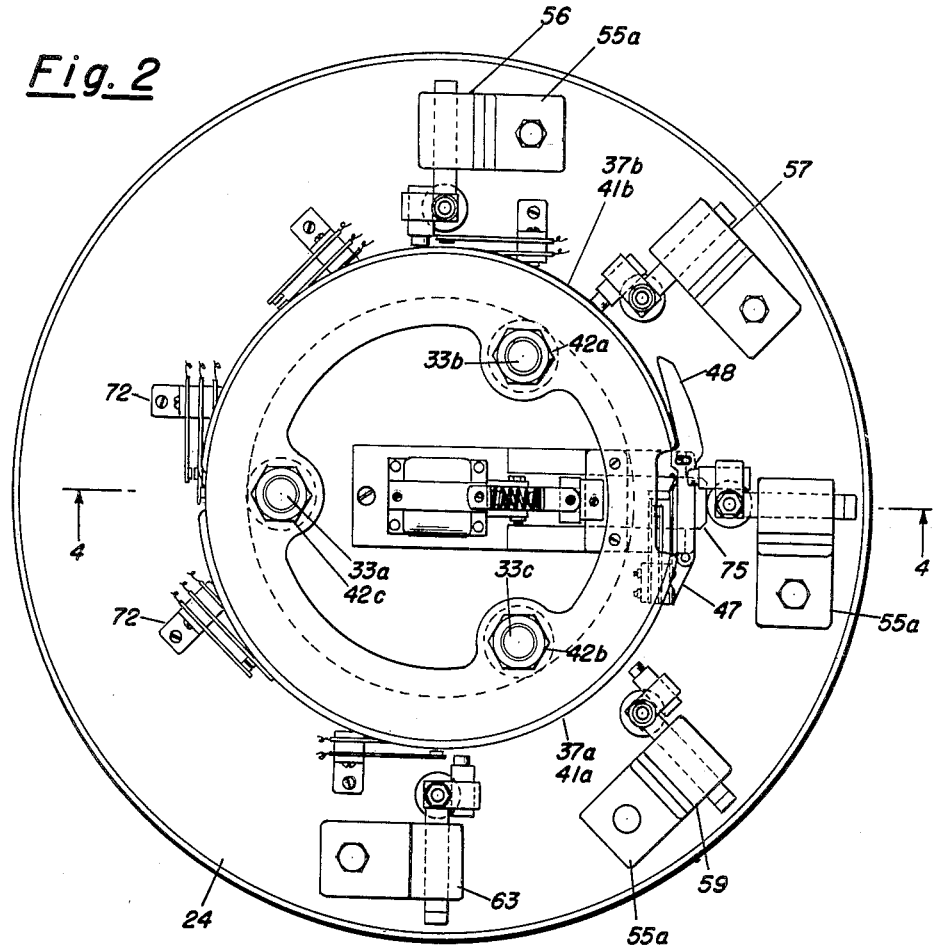
Fig. 2 is a plan view of the elevator car operating control mechanism.
Figure 3:
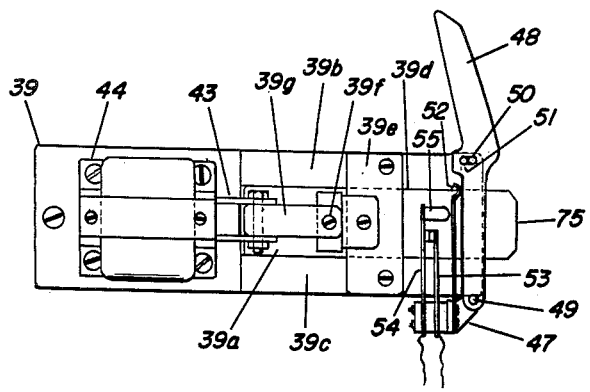
Fig. 3 is a plan view of the piloting head mechanism shown as a detail of Fig. 2.

Referring to the drawing, I have illustrated in Figure 1 the main features of an assembly or system in which is incorporated the improvement constituting my invention, and which includes a conventional form of elevator hoistway 14 extending vertically through the building 15, and opening into the floors thereof (here shown to be five in number, but which may be any number desired). Conventionally suspended to slide vertically within said hoistway 14 through the employment of the usual cables 16, traction sheaves 17, and counter weights (not shown) driven by the hoisting motor 18, is the elevator car 19; the hoisting motor being operated through conventional switches mounted upon a relay panel piloted by my electro-mechanical automatic control mechanism 20. As shown, this mechanism 20 is connected to be driven by the well known means of two steel cables 21 and 22 attached to the car 19; one of which cables extends from the top of the car to be wound around an overhead sheave in the manner similar to a measuring tape, and the other cable extends from the bottom of the car around a tension sleeve and then upward to a second overhead sheave upon which it is similarly but oppositely wound. The overhead sheaves through the connection of sprockets and sprocket chain as hereinafter described cause the operation of the control mechanism 20, one cable winding up as the other is unwound in the driving operation. The usual up and down push buttons 19a, 19b, 19c, 19d and 19e are provided for causing the control mechanism to stop the car at the floor desired. The buttons 15a, 15b, 15c, 15d, 15e, 15f, 15g and 15h, mounted on the wall of the hallway adjacent to the car entrance, allow a passenger outside the car to direct its passage to the floor from which the signal is given, and upon gaining admittance to the car, through the use of its push buttons thereafter to direct its progress to arrive at the floor of his exit.

Reference may now be had to Figs. 2 to 7, inclusive, in which I have illustrated in detail the various parts of my improved circular electro-mechanical control mechanism 20, preferably housed within the cylindrical casing 23 (shown in Fig. 1, but for purposes of illustration, omitted in Figs. 2 to 7).

The casing 23 is detachably secured to and normally rests upon the circular base plate 24, mounted upon the legs 23a (see Figs. 1 and 4). Protruding downwardly from the central portion of the plate 24 and integral therewith is the hollow extension 25 serving to house the ball bearings 26a and 26b, in which is journalled the upwardly extending shaft 27. Secured to the bottom of extension 25 is the speed reducing unit 28, which is conventional in character and is connected by the sprocket chain 29 to the sprocket 30 as shown in Fig. 1.

Radially spaced apart and secured to the carrying plate 31 and extending upwardly therefrom are the studs 33a, 33b and 33c (see Figs. 2 and 4). Firmly secured to the lower ends of the said studs and to the carrying plate 31, is the car button transfer cam 35, and also spaced therefrom, the car position indicator cam 34; also mounted upon the carrying plate 31 is the down piloting head mechanism 32. Next above and in spaced relation to the plate 31 and securely attached to said studs is the flat ring shaped support 36, of insulating material, to the periphery of which are secured the pair of two separated semi-circular directional tracks 37a and 37b; 37a being the down directional track and 37b being the up directional track, and the tracks of said pair being insulated one from the other by an air gap or other insulation. Spaced next above the support 36, and firmly secured to the said studs is the carrying plate 38 upon which is mounted the up piloting head 39. Directly above the plate 38 and spaced therefrom is the flat ring shaped support 40 of insulating material (similar to support 36), to the periphery of which are secured the two separated semi-circular down and up directional tracks 41a and 41b (insulated and similar to tracks 37a and 37b). Engaging with the upper threaded cords of said studs are the nuts 42a, 42b and 42c, serving firmly to secure together the aforesaid parts. Referring to Figs. 2 to 6, the piloting head mechanisms there shown and substantially the same in construction and in operation, except as adapted for the upward or downward movement of the elevator, so that for the purpose of illustration it is only necessary now to describe one of such mechanisms, leaving later to be set forth the adaptions thereof. In Figs. 2 to 5, accordingly, the mechanism 39 may be said to comprise the rectangular base plate 39a, to which are secured the side rails 39b and 39c, in parallel spaced relation, and provided with tracks extending longitudinally thereof, and positioned longitudinally to engage the slide 39d shaped freely to reciprocate therein, and having the projecting cam end 75 and adapted to be secured against dislodgement by the retainer plate 39e affixed to the tops of the rails 39b and 39c. Rigidly secured by the bolt 39f to top of said slide and spaced therefrom is the link 39g, pivotally connected with the armature 43 of the solenoid 44, mounted upon the base plate 39a. Normally the said armature is held in extended position by the compression spring 45, interposed between and supported by the frame of said solenoid and the bracket 46, secured to the link 39g.

Mounted upon the outer end of the slide 39d, is the frame 47, upon which is pivotally mounted by the pin 49 the long multiple stop arm 48, having the slot 50 extending laterally across the same, through which slot extends the pin 51 affixed to the frame 47, and which serves to limit the swing of the arm 48 on the pin 49. Also mounted upon the frame 47 is the return spring 52, the free end of which normally contacts the arm 48 and holds the same in outwardly extended position. And also mounted upon the frame 47 and insulated therefrom and from each other is the fixed contact finger 53 and the movable contact finger 54, and normally separating the free end of the finger 54 from the return spring 52 is the post 55 of non-conducting material.

Radially mounted upon the base plate 24 are the vertically extending brackets 55a, to which are adjustably secured the four up direction piloting switches 56, 57, 58 and 59 and the four down direction piloting switches 60, 61, 62 and 63 (switches 60 and 62 not being shown, since identical in construction with switches 61 and 63). With the exception of switches 56 and 63, all the other piloting switches are mounted in pairs, one switch over the other, upon their respective brackets, the up direction switch being located above the down direction switch. As shown, the said switches are arranged, switch 56 for the top floor, and switch 63 for the bottom floor, and one of said pairs of switches for each the intermediate floors, and all of said switches being connected to call buttons and operated as hereinafter explained. All of these piloting switches are of similar construction, and accordingly it will be necessary to describe only one of such switches as illustrative of all. Taking switch 61 as an example, such switch comprises a block 64, adjustably secured to a bracket 55, the magnetic structure 65 and the coil 66, the bar 67 mounted to slide in a passageway formed within said block; said bar being releasably held in position by a spring actuated ball operatively connected to said block and bar. To the outer end of the bar 67 is connected the armature 68; the inner end of said bar having mounted thereon the roller 69 and the brush holder 70 carrying the brush 71, the operation of which parts is shortly to be described.

Mounted upon the base plate 24, and extending upwardly therefrom are the brackets 72, and secured to said brackets are two sets of contact fingers; one of which sets comprises pairs of fingers 73a, 73b, 73c, 73d and 73e, one pair for each floor of the building, and the other set comprising triplicate finger units 74a, 74b and 74c, whose purpose will be hereinafter explained.

In Figs. 8, 9 and 10, I have shown schematically the wiring connection of my circular selector control for automatic elevators. Here the leads extending from one side of each of the up and down buttons 15a, 15b, 15c, 15d, 15e, 15f, 15g and 15h are shown to be connected with the common feed $L_2$, and the other side of each of said buttons is shown to be connected with one side of the piloting switch coils A, B, C, D, E, F, G and H, upon the corresponding piloting switches; the other side of said coils being connected with the common feed $L_1$. Also connected to said common feed $L_1$, are the brushes A', B', C', D', E', F', G' and H' of the up direction piloting switches 56, 57, 58 and 59, and the down direction piloting switches 60, 61, 62 and 63, arranged to make sliding contact with either the up or down directional tracks hereinafter described. As shown, the up directional tracks 37b and 41b are connected by lead 95 to one side of a normally closed interlock 96a on the down directional switch; the other side of said interlock being connected by lead 97 to one side of the coil 98 of the up directional switch and the other side of said coil being connected by lead 99 with the common feed $L_2$. Similarly the down directional tracks 37a and 41a are connected by lead 100 to one side of a normally closed interlock 98a on the up directional switch, the other side of said interlock being connected by lead 101 to one side of coil 96 of the down directional switch, and the other side of said coil being connected by lead 102 with the common feed $L_2$.

Also connected with said common feed $L_1$ by lead 103 is one side of normally open interlock 98b on the up directional switch and one side of normally open interlock 96b on the down directional switch; the other side of interlock 98b being connected by lead 104 to one side of the coil 105 of the down piloting head transfer solenoid, and the other side of interlock 96b being connected by lead 106 to one side of the coil 107 of the up piloting head transfer solenoid, and the remaining sides of said coils being connected by lead 108 to the feed $L_2$.

Connected with feed $L_1$ by lead 111, is one side of a pair of contacts 109a of the stop switch, the other side of said stop switch being connected by lead 112 with one side of the coil 110 of the start switch; the other side of coil 110 being connected by lead 113 to the common feed $L_2$. Also connected with feed $L_1$ by lead 114 is one side of the up multiple stop switch 64; the other side being connected by lead 115 to one side of the down multiple stop switch, and the other side of said down multiple stop switch being connected by lead 116 to one side of the coil 109 of the stop switch, and the other side of said coil 109 being connected by lead 117 to the common feed $L_2$.

In Fig. 9 is shown a special form of part of the elevator run circuit, in which, connected by lead 118 with the common feed $L_3$, is one side of a pair of contacts 110a on the start switch, and one side of a pair of contacts 109b on the stop switch; the other side of each of said switches last named being connected by lead 119 with one side of a pair of contacts 98c on the up directional switch, and with one side of a pair of contacts 96c on the down directional switch.

The operation of my invention may now be considered. When a call button is pushed, the corresponding piloting switch coil 66 is energized and the brush 71 is brought in slidable contact with one of the up directional tracks 37b or 41b, or one of the down directional tracks 37a or 41a. If the elevator is above the floor where the button is pushed, the brush will contact one of the down directional tracks. Conversely, if the elevator is below the said floor, the brush will contact one of the up directional tracks. As shown by the elevator control circuit diagram Fig. 8, this action will cause either the up directional switch coil 98, or the down directional switch coil 96 to be energized, depending upon whether an up or down directional track has been contacted. The up 98c or the down 96c directional switch contacts will then be closed causing the elevator to run in the desired direction.

It should be noted, as shown by Fig. 8, that if an up button is pressed, contacts 98b on the up directional switch will close, causing the down piloting head transfer solenoid coil 105 to be energized. The slide 39d of the down piloting head 32 will then be retracted inwardly. Conversely, if a down button is pressed, contacts 96b will close, causing the up piloting head transfer solenoid coil 107 to be energized. The slide 39d of the up piloting head 39 will be retracted inwardly. It will further be observed that when the slide 39d of the up directional piloting head 39 is not retracted inwardly, its outer end 75 will be in a position such as to contact the roller 69 on an up directional piloting switch, if said up directional piloting switch coil 66 has been energized so as to make contact between the brush 71 and one of the directional tracks. Conversely, when the slide 39d of the down directional piloting head 32 is not retracted inwardly, its outer end 75 will be in a position such as to contact roller 69 on a down directional piloting switch, if said down directional piloting switch coil 66 has been energized so as to make contact between the brush 71 and one of the directional tracks.

Once the elevator has started to run, it will continue to run until the brush which is in contact with one of the directional tracks slides past the end of said track into the open space between the pairs of directional tracks.

Let it be assumed that an up button at the third floor has been pushed and that the elevator is at the first floor. The coil 66 of the piloting switch corresponding to the third floor up button will be energized, pulling armature 68 inwardly which, in turn, causes sliding bar 67 to move inwardly. As said bar moves inwardly, brush holder 70 and brush 71 contained therein is moved so as to cause said brush 71 to make contact with the up directional track 41b. As already explained, this will cause the elevator to run in an upward direction. Since the carrying plate 31 and the entire assembly mounted upon said plate by means of the studs 33a, 33b and 33c, rotate in step with the vertical up or down movement of the elevator, said track 41b will be carried in a counter-clockwise direction until its edge slides past said brush 71. When this occurs, the circuit will be broken and the up directional switch contact 98c will open, causing the elevator run circuit to be broken and a stop initiated. As the track rotates, the up direction piloting head 39 mounted on carrying plate 38 also moves in said counter-clockwise direction, its outer end finally making contact with roller 69 of the aforementioned piloting switch, pushing said roller outwardly. When this occurs, the sliding bar 67, the brush holder 70 and the brush 71 mounted thereon also move outwardly causing the piloting switch to be reset and the third floor up call canceled.

If a down button had been pushed at the third floor, the coil 66 of the piloting switch corresponding to the third floor down button would have been energized. The brush 71 would then have made contact with the up directional track 37b, and again cause the elevator to run in an up direction to the third floor.

Referring now to Figs. 8 and 9, it will be seen that when the elevator is travelling in an up direction the contacts 98b on the up directional switch are closed. Coil 105 of the down piloting head transfer solenoid is therefore energized and the slide 39d of piloting head is retracted inwardly in such a position as not to make contact with roller 69. This condition will remain as long as the elevator is travelling upward. However, when the elevator reaches the third floor and the circuit is broken as already described, the up directional switch contacts 98b will open, causing the down piloting head transfer solenoid coil to be de-energized. The slide 39d of the aforementioned down piloting head will then be moved outwardly by action of compression spring 45, and the outer end of said slide will push roller 69 outwardly to again cancel the call.

Let there now be considered the case where two or more call buttons have been pushed. Let it be assumed that up buttons at the second and third floors have been pushed, the elevator car again being at the first floor. There will then be two brushes contacting the up directional track 41b. As the elevator approaches the second floor the brush of the corresponding piloting switch will slide off the said track. This action alone, however, will not cause the elevator to stop. Since the up directional switch coil 98 is still energized due to the fact that there is still a brush contacting the up directional track 41b. As before mentioned brush slides off said track, the pivotally mounted multiple stop arm 48 contacts the roller 69 of the second floor up piloting switch (since the slide 39d of the up piloting head 39, upon which slide the multiple stop arm assembly is mounted, is extended). This action moves contact finger 54 away from contact finger 53. Referring now to Figs. 8 and 9, the up multiple stop switch 64 is opened, stop switch coil 109 is de-energized and stop switch contacts 109b open. The circuit to the up directional switch contacts 98c is thereupon opened, and the elevator will stop. When stop switch coil 109 is de-energized, contacts 109a close, causing start switch coil 110 to be energized. Start switch contacts 110a in accordance with timing mechanism therein incorporated, then close after a controlled interval of time has elapsed. The circuit to the up directional switch 98c is thereupon reestablished, causing the elevator to continue in an upward direction to answer the remaining call at the third floor.

It should be understood that as the elevator approached the second floor, the outwardly extending slide 39d of the piloting head 39 makes contact with the roller 69 and cancels the call as already described. Referring again to Figs. 8 and 9, it will be seen that when the roller 69 is pushed outwardly to cancel the call, multiple stop arm 48 is allowed to return to its normal outwardly extended position and contact finger 54 again makes contact with contact finger 53. The stop switch coil 109 is then re-energized, causing stop switch contacts 109b to reclose and contacts 109a to open. When contacts 109a open, start switch coil 110 is de-energized and start switch contacts 110a open. The run circuit is now reestablished in preparation for the next floor stop. It should be noted that here the elevator has traveled in an upward direction to make up calls, and that it has stopped consecutively at each floor where up buttons have been pressed as the elevator car came to said floors.

Let it now be assumed that down buttons instead of up buttons had been pressed at the second and third floors, the elevator again being at the first floor. There would then be two brushes contacting the up directional track 37b, said brushes being mounted on piloting switches corresponding to the second and third floor down buttons.

As already explained, the slide 39d of the down piloting head 32 is retracted inwardly when the elevator is moving in an upward direction; and the multiple stop arm 48 and the slide 39d will not be in a position to contact the roller 69 of the second floor down piloting switch.

Under these conditions, the elevator will not stop at the second floor and the call at said floor will not be canceled. The elevator will therefore continue in an upward direction until the brush 71 on a piloting switch corresponding to the highest floor where a call is registered (in this case the third floor) slides off the up directional track 37b. The elevator will then stop due to the fact that no brushes are contacting the said up directional track, and the up directional switch coil 98 will be de-energized. Now, since the call at the second floor was not canceled, the brush 71 on the down piloting switch corresponding to the second floor will now be in contact with the down directional track 37a. After a timed interval the down directional switch coil 96 will be energized and the down directional switch contacts 95c will close and the elevator will run in a down direction to the second floor. It should be noted that when the elevator is moving in said down direction, the slide 39d of the down piloting head 32 is extended outwardly since the down piloting head transfer solenoid coil 105 is de-energized, contact points 98b on the up directional switch being open. A stop will be made at the second floor and the call canceled as already described.

Figure 6:
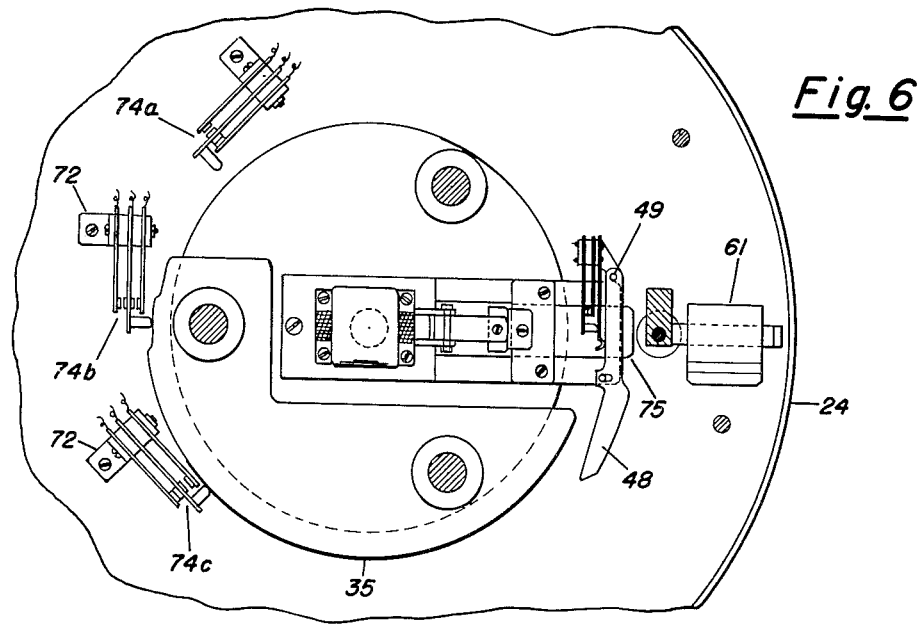
Fig. 6 is a horizontal section on line 6—6 of Fig. 4, looking in the direction indicated by the arrows.

Referring to Figs. 6 and 9, it will be seen that transfer switches 74a, 74b and 74c and actuated by cam 35 are provided. These switches, one being provided for each intermediate floor, act to transfer each of the car push buttons corresponding to said intermediate floors from the up to the down direction piloting switches as the elevator car passes said intermediate floor.

Figure 7:
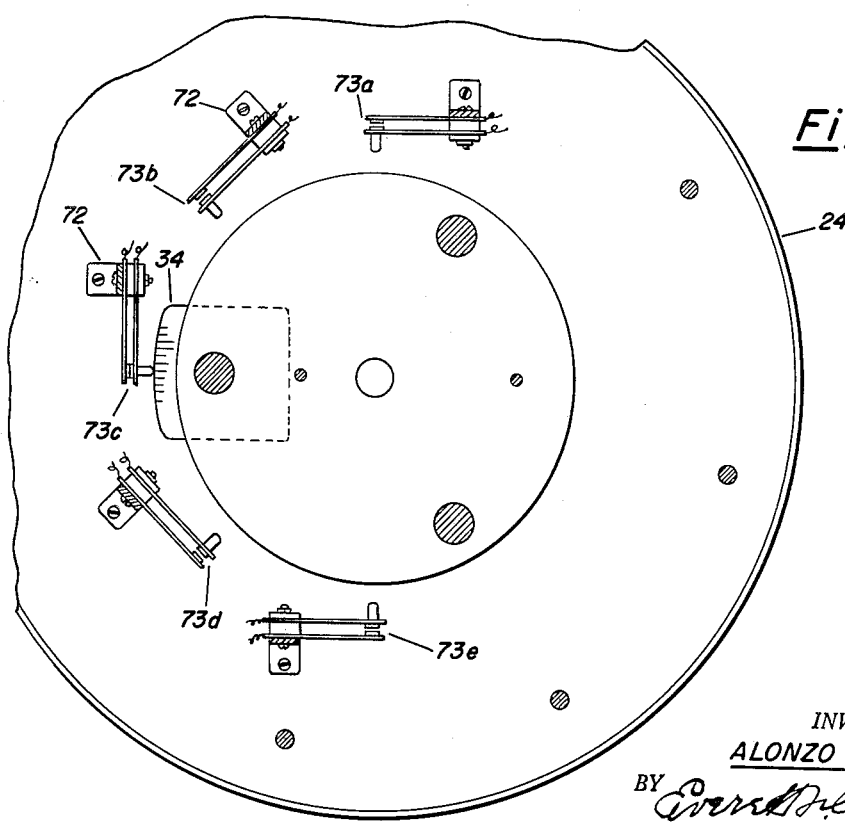
Fig. 7 is a horizontal section on line 7—7 of Fig. 4, looking in the direction indicated by the arrows.

Fig. 7 shows switches 73a, 73b, 73c, 73d and 73e, and cam 34 which switches serve to energize position indicator lights as the elevator approaches corresponding floors.

My invention may be embodied in other specific forms without departing from the spirit or essential characteristics thereof. The present embodiments, as above set forth are therefore to be considered in all respects as illustrative and not restrictive, the scope of my invention being indicated by the appended claims rather than by the foregoing description, and all changes which may come within the meaning and range of equivalency of the claims are therefore intended to be embraced therein.

What I claim and desire to secure by Letters Patent is:

1. In a control system for an elevator car adapted for starting and stopping the car, said system comprising electrically set piloting and mechanically reset piloting switches and two separated pairs of semi-circular directional tracks, the tracks of each pair being insulated one from the other, for starting and stopping the car, and selector control mechanism responsive to said switches.

2. In a control system for an elevator car adapted for starting and stopping the car, said system comprising electrically set and mechanically reset piloting switches and two separated pairs of semi-circular directional tracks, the tracks of each pair being insulated one from the other, two piloting heads secured to carrying plates, and two duplicate stop arms in inverted relation one with the other mounted upon said piloting heads, and positioned to initiate the stopping of the car.

3. A control system for an elevator car, including a plurality of piloting switches and two piloting heads, said system comprising means for electrically actuating and setting up said switches for starting the car, means for mechanically holding said switches in starting and running position, and means for mechanically resetting said switches by action of said piloting heads.

4. A control system for an elevator car, including a plurality of piloting switches and two piloting heads, said system comprising means for electrically actuating and setting up said switches for starting the car, means for mechanically holding said switches in starting and running position, and slide means for mechanically resetting said switches by action of said piloting heads.

5. A control system for an elevator car, including a plurality of piloting switches and a piloting head, said system comprising means for electrically actuating and setting up said switches for starting the car, means for holding said switches in starting and running position, and retractable slide means for mechanically resetting said switches by action of the piloting head.

6. A control system for an elevator car, including a plurality of piloting switches and two piloting heads, said system comprising means for electrically actuating and setting up said switches for starting the car, means for holding said switches in starting and running position, and retractable slide means for mechanically resetting said switches by action of the slide, multiple stop switches with multiple stop cams to operate multiple stop switches for setting up the stopping of the car when more than one call is registered in direction of travel of the car.

7. A control system for an elevator car, including a plurality of piloting switches, two piloting heads and two multiple stop switches with cams, said system comprising a circular plate having a hub, a drive shaft journalled in bearings in said hub, two circular carrying plates in spaced relation connected by studs and mounted to turn upon said drive shaft; the said piloting switches being mounted upon the plate having a hub, and the piloting heads being mounted upon the circular carrying plates; and means for electrically actuating and setting up said switches for starting and stopping the car, means for holding said switches in starting and running position, and retractable slide means for mechanically resetting said switches by action of the piloting heads.

8. A control system for an elevator car, including a plurality of piloting and transfer switches, two piloting heads and two multiple stop switches with cams, said system comprising a circular plate having a hub, a drive shaft journalled in bearings in said hub, two circular carrying plates in spaced relation connected by studs and mounted to turn upon said drive shaft; the said piloting and transfer switches being mounted upon the plate having a hub, and the piloting heads being mounted upon the circular carrying plates; and means for electrically actuating and setting up said switches for starting and stopping the car, means for holding said switches in starting and running position, and retractable slide means for mechanically resetting said switches by action of the piloting heads.

9. A control system for an elevator car, including a plurality of piloting switches, two piloting heads and two multiple stop switches with cams, said system comprising a circular plate having a hub, a drive shaft journalled in bearings in said hub, two circular carrying plates in spaced relation connected by studs and mounted to turn upon said drive shaft; two flat ring shaped supports of insulating material secured to said studs, a pair of semi-circular directional tracks for starting and stopping the car mounted upon each ring shaped support, one track of each pair being insulated from the other; the said piloting switches being mounted upon the plate having a hub, and the piloting heads being mounted upon the circular carrying plates; and means for electrically actuating and setting up said switches for starting and stopping the car, means for holding said switches in starting and running position, and retractable slide means for mechanically resetting said switches by action of the piloting heads.

References Cited in the file of this patent

UNITED STATES PATENTS

| | | |
|---|---|---|
| 704,337 | Ihlder | July 8, 1902 |
| 2,056,626 | Smart | Oct. 6, 1936 |
| 2,137,075 | Chubb | Nov. 15, 1938 |
| 2,532,809 | Guay | Dec. 5, 1950 |